(12) United States Patent
McLaughlin (10) Patent No.: US 10,408,702 B2
(45) Date of Patent: Sep. 10, 2019

(54) HYDRAULIC PLATE AND PIPE CONNECTION SYSTEM

(71) Applicant: Stuart McLaughlin, Magnolia, TX (US)

(72) Inventor: Stuart McLaughlin, Magnolia, TX (US)

( * ) Notice: Subject to any disclaimer, the term of this patent is extended or adjusted under 35 U.S.C. 154(b) by 304 days.

(21) Appl. No.: 15/402,571

(22) Filed: Jan. 10, 2017

(65) Prior Publication Data

US 2018/0195928 A1 Jul. 12, 2018

(51) Int. Cl.
*G01M 3/28* (2006.01)
*E21B 19/16* (2006.01)

(52) U.S. Cl.
CPC ........... *G01M 3/2815* (2013.01); *E21B 19/16* (2013.01); *E21B 19/163* (2013.01); *E21B 19/165* (2013.01); *G01M 3/2853* (2013.01)

(58) Field of Classification Search
CPC ... G01M 3/2853; G01M 3/2815; E21B 19/16; E21B 19/19; E21B 19/163; E21B 19/165
See application file for complete search history.

(56) References Cited

U.S. PATENT DOCUMENTS

2015/0240571 A1* 8/2015 Bowles .................. E21B 17/04
285/351

* cited by examiner

*Primary Examiner* — Paul M. West
(74) *Attorney, Agent, or Firm* — Kearney, McWilliams & Davis, PLLC; William C. Yarbrough (57) ABSTRACT

The present invention discloses a system comprising a hydraulic plate assembly, a hydraulic grapple pipe connection assembly, hydraulic circuit assembly, or a combination thereof to set and attach pipe connections to equipment, such as oilfield equipment and method(s) of using the system. The use of this system makes the process of attaching the connections to the pipe safe, quick and easy.

20 Claims, 5 Drawing Sheets

HYDRAULIC PLATE AND PIPE CONNECTION SYSTEM

FEDERAL FUNDING LEGEND

This invention was not created using federal funds.

BACKGROUND OF THE INVENTION

Field of the Invention

The present invention generally relates to a device or a system that allows setting and attachment of pipe connections via hydraulic ports within a plate assembly without the need for pipe rotation. Specifically, the present invention relates to a system that comprises a hydraulic plate to make pipe connections by using at least one hydraulic hose and a hydraulic pump, thus eliminating the need for use of makeup tongs and pipe rotation of threaded assemblies.

Background

Conventional oilfield equipment including but not limited to a wellbore assembly, pipe connection and bottom hole assembly, utilizes mechanical systems to connect different parts to each other. The most common means of connecting these parts together is by threads. However, in some instances, the threads either cannot be used or are not suited for a particular operation. If the threads cannot be used to connect the parts together, a grapple type connection is used to hold the connection to the pipe. The grapple type connection is affixed to the pipe using techniques commonly known in the industry, such as, hammering via a pull plate followed by using tongs or wrenches to secure the connection. However, this process is time consuming and involves safety hazards and multiple field hands.

Thus, there is a long-standing and significant and un-met need in the art for a system that aids in making pipe connections in a safe, less time consuming and easy manner and with the use of hydraulic pressure. The present invention satisfies this long-standing need in the art.

SUMMARY OF THE INVENTION

In a preferred embodiment, the present invention is directed to a system, comprising: a hydraulic plate assembly, a hydraulic grapple pipe connector assembly, a hydraulic circuit assembly, or a combination thereof, wherein the hydraulic plate assembly comprises: a hydraulic plate; at least two ports, wherein the ports allow passage of hydraulic pressure to the hydraulic plate assembly; at least two pairs of O' Rings; means to install a hydraulic grapple pipe connection assembly into the hydraulic plate assembly; at least three ports, wherein each of at least two ports attach to hydraulic line and wherein at least one port attaches to a bleed valve to vent external fluid or pressure, or a combination thereof; wherein the hydraulic grapple pipe connector assembly comprises: a top sub; a lower hydraulic housing, wherein the lower hydraulic housing is connected to the top sub and seals around the end of a pipe; at least one grapple to hold the pipe; a friction ring with a diameter that is larger than the diameter of the pipe; a buttress thread; at least one pair of Piston O Rings; at least one pipe seal; a hydraulic setting port; an external seal port; thread to enable attachment of the hydraulic grapple pipe connection assembly to the hydraulic plate assembly; a piston assembly, or a combination thereof; wherein the hydraulic circuit assembly comprises: a hand pump; a two-way valve; at least one hydraulic quick connection, snap tight connection or both; a pipe bleed valve, or a combination thereof.

In a related embodiment, the system further comprises: at least two wireless pressure transducers to collect and transmit wireless data to an electronic device that monitors, records or both, all pressure setting sequences and tests. In another related embodiment, the hydraulic plate sets a pipe connection to the pipe, externally tests internal seals on the pipe connection in the presence or absence of fluid within the pipe, activates the hydraulic grapple type connector assembly onto a pipe end without the need for threads to connect the pipe to the hydraulic grapple type connector assembly, provides testing of the grapple grip force by pull against the hydraulic plate assembly via a pull plate step, provides ports between the hydraulic plate assembly and the hydraulic grapple type connector assembly so that pressure can be applied via the hydraulic plate to set the hydraulic grapple type connector assembly onto the pipe, to remove the hydraulic plate or both, supports a pull test on the hydraulic grapple type connector assembly to determine sufficient anchor force with or without the need to remove applied pressure, provides constant force during pull test to maintain and energize the piston and move the grapple upwards and clamp onto the pipe, or a combination thereof.

In yet another related embodiment, the hydraulic plate assembly performs multiple functions in one single application, the multiple functions comprising: allowing the grapple to attach to the pipe firmly, allowing external testing of pipe seals, performing pull test on hydraulic grapple type connector assembly, allowing internal pressure test of the pipe, performing bleed of fluid or internal pressure of pipe, providing wireless telemetry for pressure test sequences, activating a setting piston, or a combination thereof. In still yet another related embodiment, the hydraulic grapple type connector assembly attaches to the pipe using hydraulic pressure and not threads. In another related embodiment, the piston assembly in the hydraulic grapple type connector assembly comprises: a piston, O rings, buttress thread or a combination thereof. In yet another related embodiment, at least one of the ports in the hydraulic grapple type connector assembly allows testing of internal pipe seals. In still yet another related embodiment, the hydraulic grapple type connector assembly can be seal tested internally or externally. In further yet another related embodiment, the grapple in the hydraulic grapple type connector assembly enables the hydraulic grapple type connector assembly to attach to the pipe that has oversized diameter. In another related embodiment, the diameter of the grapple is reduced by hydraulic pressure so that the hydraulic grapple type connector assembly fits firmly to the pipe. In yet another related embodiment, the hydraulic circuit assembly sets and tests a hydraulic grapple type connector assembly onto the pipe using hydraulic pressure, provides pressure via the hydraulic plate assembly to apply sufficient setting force to set a grapple ring onto the pipe with sufficient force to indent the pipe with the grapple, or both. In still yet another related embodiment, the hydraulic circuit assembly comprises multi-position valve capable of diverting hydraulic fluid to initiate setting of hydraulic grapple type connector assembly via a hydraulic manifold. In further yet another related embodiment, the lower hydraulic body housing provides multiple hydraulic ports in the same body to allow grapple setting and seal testing on the hydraulic grapple type connector assembly.

In another preferred embodiment, the present invention is directed to a method of making connection to a pipe, comprising: assembling the components of the hydraulic grapple slip connector assembly of the above-mentioned system; installing the assembled hydraulic grapple slip connector assembly onto the hydraulic plate assembly of the above-mentioned system to form a fully assembled hydraulic plate assembly and hydraulic grapple slip connector assembly; attaching the hydraulic circuit assembly of the above-mentioned system to the fully assembled hydraulic plate assembly and hydraulic grapple slip connector assembly; and connecting the hydraulic circuit assembly attached to the fully assembled hydraulic plate assembly and hydraulic grapple slip connector assembly to the end of the pipe.

In another related embodiment, the method further comprises: pressure testing the pipe end seals by turning the two-way valve in the opposite direction from its current position to direct hydraulic fluid to the hydraulic line, wherein the hydraulic line directs pressure through one of the ports on the hydraulic plate assembly, directs flow between the O' rings on the hydraulic plate assembly, directs hydraulic pressure between the seals, or a combination thereof. In yet another related embodiment, the method further comprises: bleeding off the pressure back to the hydraulic pump. In still yet another related embodiment, the assembling of the components of the hydraulic grapple slip connector assembly comprises: connecting the top sub, the lower hydraulic housing, the grapple, the friction ring, the buttress head, the Piston O rings, the pipe seal(s), the hydraulic setting port, the external seal port and the thread. In further yet another related embodiment, wherein installing the assembled hydraulic grapple slip connector assembly onto the hydraulic plate assembly comprises: inserting the hydraulic grapple pipe connection assembly into the means for installing the hydraulic grapple slip connector assembly present on the hydraulic plate assembly; and turning the thread on the hydraulic grapple pipe connection assembly with a twisting or rotating motion into the hydraulic plate assembly until the thread stops twisting or rotating.

In another related embodiment, the fully assembled hydraulic plate assembly and hydraulic grapple slip connector assembly comprises: one of the O' rings on the hydraulic plate assembly aligned with the external seal port of the hydraulic grapple slip connector assembly and the other O' ring aligned with the grapple of the hydraulic grapple slip connector assembly, wherein the alignment allows a hydraulic fluid to be directed between the O' rings. In yet another related embodiment, attaching the hydraulic circuit assembly of the system to the fully assembled hydraulic plate assembly and hydraulic grapple slip connector assembly, comprises: connecting one end of the hydraulic lines to the ports on the hydraulic plate assembly; and connecting other end of the hydraulic lines to the quick connectors on the hydraulic grapple slip connectors, wherein the quick connectors are connected to the hydraulic pump via a two-way valve. In still yet another related embodiment, connecting the hydraulic circuit assembly attached to the fully assembled hydraulic plate assembly and hydraulic grapple slip connector assembly to the end of the pipe, comprises: sliding the entire assembly comprising the fully assembled hydraulic plate assembly and hydraulic grapple slip connector assembly connected to the hydraulic circuit assembly onto and up the end of the pipe until the entire assembly cannot move further and will "No-Go" inside the lower piston housing on the hydraulic grapple slip connector assembly; pressing the hydraulic pump to apply hydraulic pressure through one of the ports on hydraulic plate assembly that is connected to one of the hydraulic lines, thereby directing hydraulic fluid between the O rings to activate the piston assembly in the hydraulic grapple slip connector assembly to move forward and forcing the slips to clamp onto the end of the pipe; and bleeding off the pressure back to the hydraulic pump.

DETAILED DESCRIPTION OF THE PREFERRED EMBODIMENTS

The present invention provides a system that allows setting and attachment of connectors to an equipment without the need for rotation of the equipment. More specifically, the present invention provides a system that allows setting and attachment of pipe connectors to oilfield equipment including but not limited to a wellbore assembly, a pipe connection and a bottom hole assembly, by applying hydraulic pressure.

Figure 1:
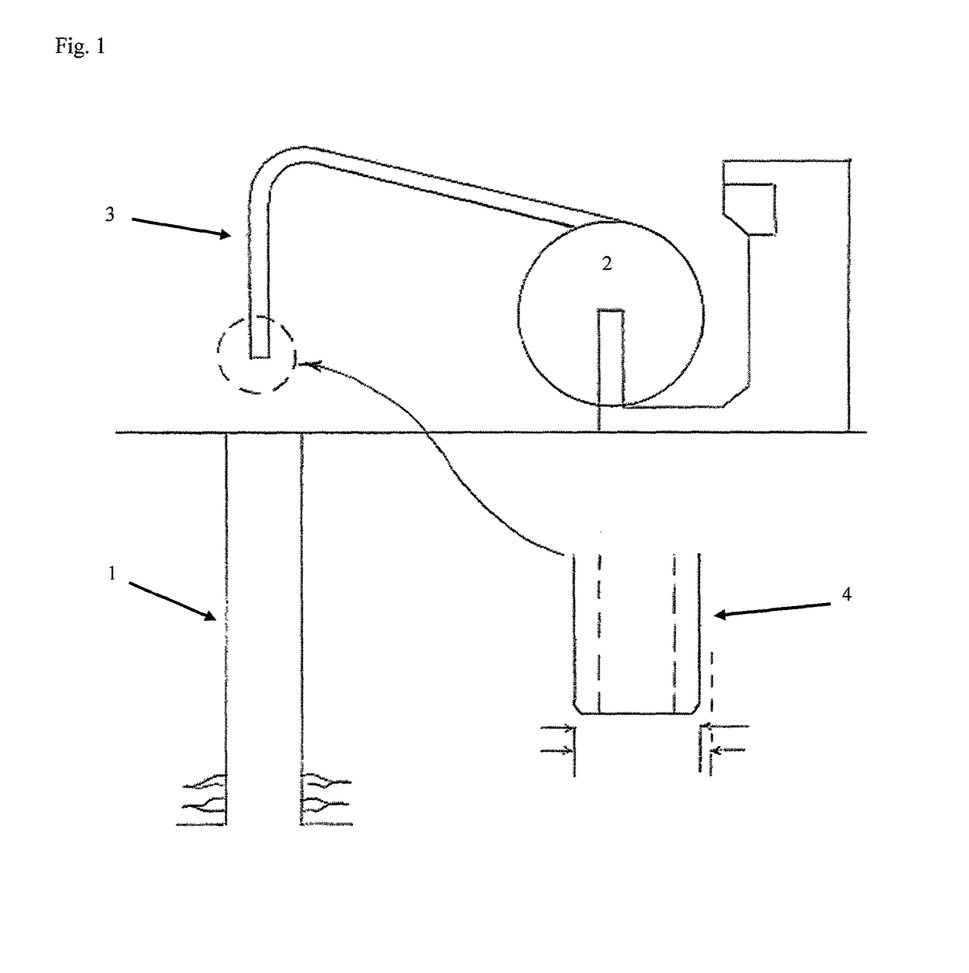
FIG. 1 shows an illustration of a typical coiled tubing unit and coil reel prior to being deployed in a wellbore.

FIG. 1 shows a layout for coiled tubing 2 and a reel 3 of pipe 4 prior to being deployed in a wellbore 1. The pipe end 4 is prepared by filing or grinding the end of the pipe to remove burrs and rough edges to prevent seal damage as the pipe is installed into a hydraulic pipe connection shown in FIG. 3. Additionally, a pipe that is used multiple times will accrue wear and tear and will enlarge in size or balloon due to pressure cycling through the pipe, which makes the pipe diameter larger as shown by the arrows in FIG. 1.

Figure 5:
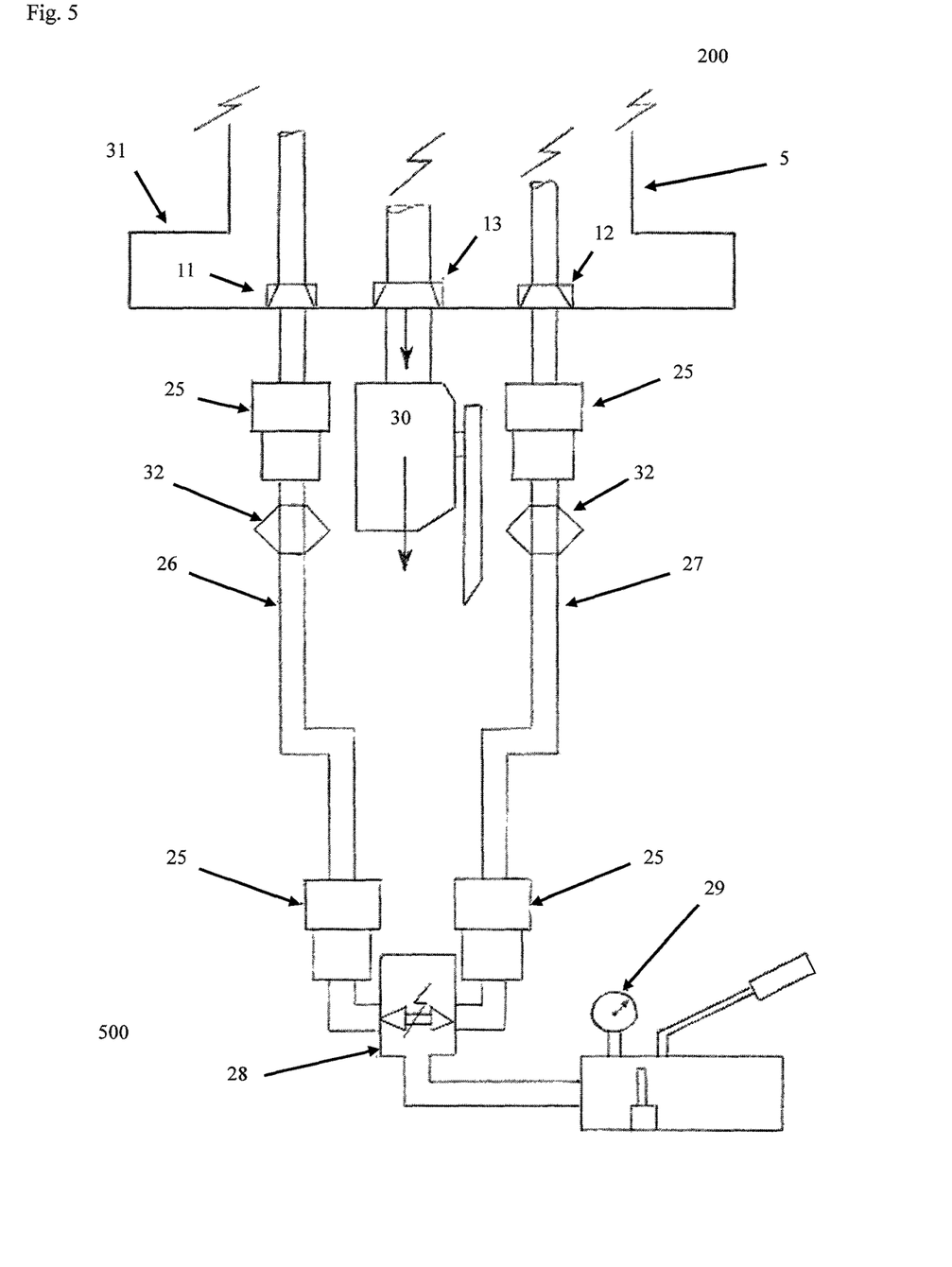
FIG. 5 shows the hydraulic circuit assembly comprising hydraulic pump system, two-way valve, quick connect hydraulic lines and bottom section of the hydraulic plate system that permits actuation of the connection onto the pipe.

In a preferred embodiment, the system disclosed herein comprises a hydraulic plate assembly 200, a hydraulic grapple pipe connector assembly 300, a hydraulic circuit assembly 500, or a combination thereof. For instance, the hydraulic plate 5 in the hydraulic plate assembly 200 disclosed herein and shown in FIG. 2 helps in setting and attaching a pipe connection to the oilfield equipment via a two-way valve 28 through hydraulic grapple pipe connector assembly as shown in FIG. 5. Additionally, grapple 16 in the hydraulic grapple pipe connector assembly 300 allows the pipe to connect to the equipment even when the end of the pipe has ballooned. The hydraulic grapple pipe connector assembly 300 may comprise one or more grapples.

Figure 2:
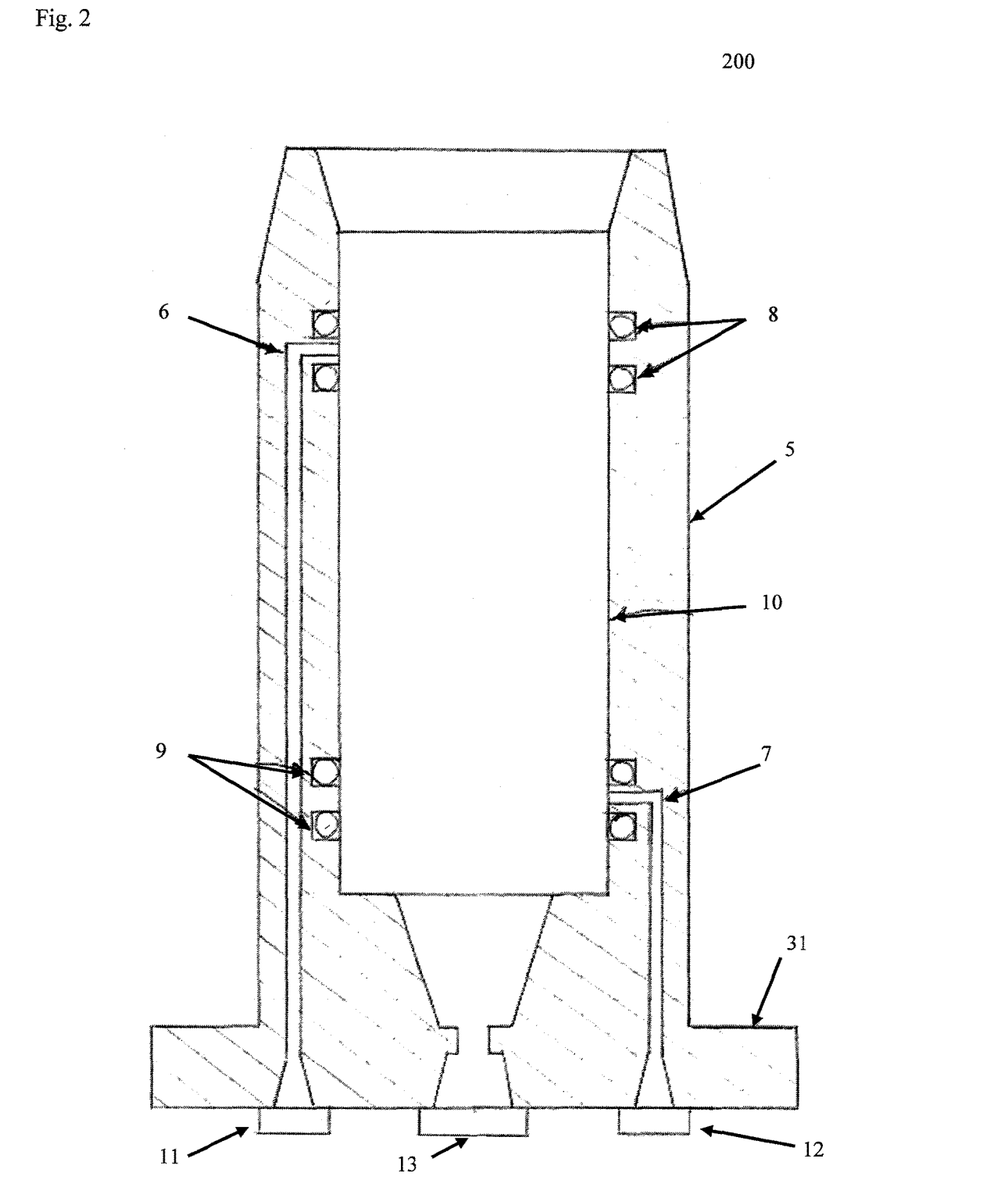
FIG. 2 shows the hydraulic plate assembly that permits setting of a pipe connector using hydraulic pressure ports.

In another preferred embodiment, the hydraulic plate assembly 200 shown in FIG. 2 comprises: a hydraulic plate 5, at least two ports 6 and 7 to allow passage of hydraulic pressure, at least two pairs of hydraulic plate assembly O' Rings 8 and 9, means 10 to install the hydraulic pipe connection assembly 300 into the hydraulic plate assembly 200, at least two hydraulic connection ports 11 and 12 to attach to two hydraulic lines 26 and 27, respectively, a hydraulic bleed valve port 13 to attach bleed valve 30, or a combination thereof. For instance, the hydraulic plate 5 is used to direct hydraulic pressure from a pump 29 shown in FIG. 5 to a hydraulic grapple pipe connector assembly 300 shown in FIG. 3. Additionally, the hydraulic plate 5 provides hydraulic communication to set the grapple 16 in the hydraulic pipe connector assembly 300 via the hydraulic connection port 11. Furthermore, the hydraulic plate 5 also provides hydraulic communication to test the seals 20 in the hydraulic pipe connector assembly 300.

Figure 3:
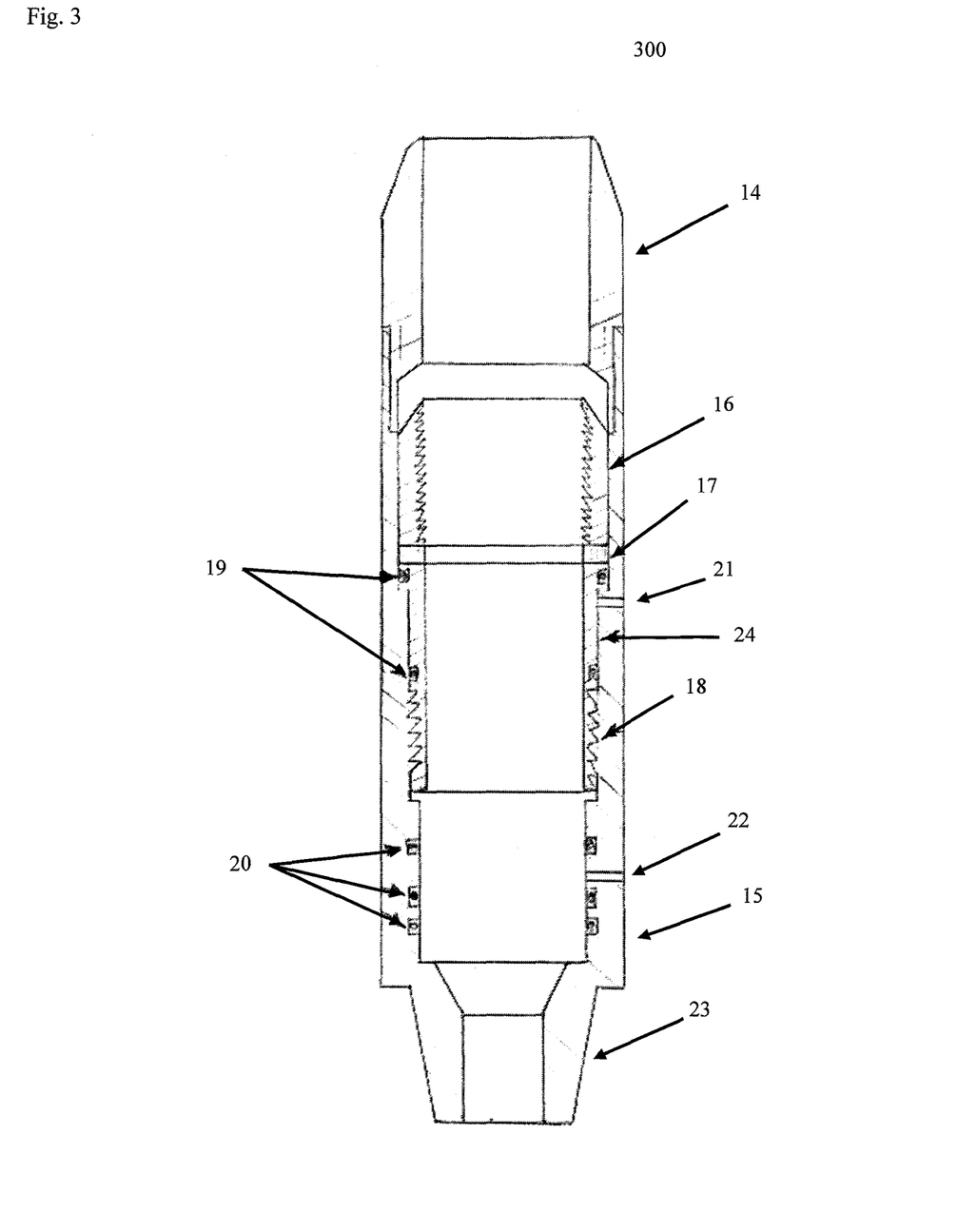
FIG. 3 shows a hydraulic grapple pipe connector assembly used to attach to the end of the coil pipe.

In another preferred embodiment, the hydraulic grapple pipe connector assembly 300 shown in FIG. 3 is designed to grip the pipe to which it is attached to and comprises: a top sub 14 that connects to a lower hydraulic housing 15, the lower hydraulic housing 15 that seals around the end of the pipe and permits pressure testing of the pipe seals 20, a grapple 16 to hold the pipe 4, a friction ring 17 that has a diameter that is larger than the diameter of the pipe 4, a buttress thread 18, Piston O' Rings 19, at least one pipe seal 20 on one side or on both sides of the connector, hydraulic setting port 21, an external seal port 22, thread 23 to attach to the hydraulic plate assembly 200, a piston assembly 24 or a combination thereof. For instance, the lower hydraulic housing 15 seals around the end of the pipe 4 and allows external pressure testing of the pipe seals 20. The piston assembly 24 and the buttress thread 18 are activated by the hydraulic pressure and move upward to set the grapple 16 and prevent release once the hydraulic pressure is removed via the buttress thread 18. The top sub 14 allows the grapple 16 to be forced into the lower hydraulic housing 15, thereby causing the grapple 16 to reduce in size and grip onto the pipe 4. In another preferred embodiment, the friction ring 17 is made of a dissimilar material, including but not limited to beryllium copper to prevent binding of materials as they move such that the grapple 16 and the piston assembly 24 do not gall when uninstalling the hydraulic pipe connector assembly 300.

In another preferred embodiment, the hydraulic circuit assembly 500 shown in FIG. 5 is used to apply pressure to the hydraulic plate assembly 200 that directs the pressure to the hydraulic grapple pipe connector assembly 300 allowing the setting sequence to commence and comprises a hand pump 29, a two-way valve 28, at least one hydraulic quick connection or snap tight connection 25, a pipe bleed valve 30, or a combination thereof.

In yet another preferred embodiment, the hydraulic circuit assembly 500 shown in FIG. 5 is attached to the hydraulic plate assembly 200 via flexible hydraulic lines 26 and 27 using hydraulic quick connectors 25. In another preferred embodiment, the hydraulic line 26 is attached to hydraulic connection port 11 that permits hydraulic fluid to set the grapple 16 (see FIG. 4) onto the pipe while the hydraulic line 27 is attached to hydraulic connection port 12 that permits the hydraulic fluid to externally test the piston O' ring 19 in the hydraulic pipe connection assembly 300. These hydraulic lines are further attached to a two-way valve 28 that can direct pressure to either line independently via the hydraulic pump 29. In yet another preferred embodiment, the bleed valve 30 is attached directly to a hydraulic bleed valve port 13 and allows the pipe 4 to be tested internally if required and allows venting of pressure or bleeding off of fluid within the pipe 4.

In another preferred embodiment, a method to attach the hydraulic grapple pipe connector assembly 300 to the pipe comprises: installing the hydraulic pipe connection assembly 300 into the means 10 of the hydraulic plate assembly 200, and turning the thread 23 with a twisting or rotating motion into the hydraulic plate assembly 200 until the thread 23 stops twisting or rotating, thereby attaching the hydraulic pipe connection assembly 300 to the hydraulic plate assembly 200. This causes alignment of the hydraulic plate assembly O' Rings 9 on the hydraulic plate assembly 200 across the external seal test port 22 and the alignment of the hydraulic plate assembly O' Rings 8 across the grapple 16.

In further yet another preferred embodiment, a method to attach the hydraulic circuit assembly 500 comprises: connecting one end of the hydraulic lines 26 and 27 to hydraulic connection ports 11 and 12, respectively; connecting the other end of the hydraulic lines 26 and 27 to the quick connectors 25, wherein the quick connectors 25 are attached to the two-way valve 28 and then to the hydraulic pump 29.

In still yet another preferred embodiment, the grapple 16 has a larger inside diameter than the outside diameter of the pipe 4. This allows the entire assembly 400 shown in FIG. 4 to slide easily to the end of the pipe 4, without any friction between the grapple 16 and the pipe 4.

In further yet another preferred embodiment, the setting of the grapple 16 can be initiated by applying pressure to the two-way valve 28, which sends pressure to the hydraulic line 26 only. The hydraulic pressure will travel through the hydraulic line 26 and through hydraulic connection port 11 into port 6, then in the hydraulic plate 5 between the O'Rings 8 through hydraulic setting port 21 and ultimately into the piston assembly 24. This will force the piston assembly 24 to move upward, thereby setting the grapple 16 onto the pipe and securing it.

In still yet another preferred embodiment, the pipe seal 20 testing sequence is initiated by applying pressure to the two-way valve 28 that is set to send pressure to the hydraulic line 27 only. The hydraulic pressure will travel through the hydraulic line 27, through the port 12 and into the port 7 in the hydraulic plate 5 between the hydraulic plate assembly O' Ring 9 and further through the external seal port 22 and between the pipe seals 20, thereby allowing the pipe seals 20 to be pressure tested. After each pressure sequence on the lines 26 and 27, the lines 26 and 27 can be bled off independently. In another preferred embodiment, testing of the pipe seals 20 internally by filling the pipe 4 with fluid or gas can be accomplished by pumping the fluid or gas into the pipe 4 and testing the pipe seals 20 between the outer diameter of the pipe 4 and the pipe seals 20.

In another preferred embodiment, a "Pull Test" can be performed on the pipe 4 via a pull plate step 31 once the hydraulic grapple pipe connection assembly 300 is attached securely to the pipe 4. This pull plate step 31 allows for the entire assembly 400 in FIG. 4 to be pulled against a No-Go or lubricator of the type known to those skilled in the art and to ensure that the hydraulic grapple pipe connector assembly 300 shown in FIG. 3 is securely attached to the pipe 4. This pull test can be performed multiple times and pressure can be re-applied to the grapple set line also identified as hydraulic connection port 11 and the test line also identified as hydraulic connection port 12 at any point during the operation.

In yet another preferred embodiment, as depicted in FIG. 5, the system disclosed herein also comprises two wireless pressure transducers 32 that collect and transmit wireless data to an iPhone, iPad, or similar device that monitors and records all pressure setting sequences and tests. This is a crucial part of the system to ensure, monitor and maintain consistent operation of the hydraulic circuit assembly 500, to calibrate setting and test sequences and to maintain these records for accuracy and repeatability by the end user. The wire pressure transducers 32 may be installed either on the hydraulic circuit assembly 500 shown in FIG. 5 or affixed to the hydraulic connection ports 11 and 12.

In another preferred embodiment, once the test is complete, the quick connectors 25 nearest to the hydraulic plate 5 are released and removed. The bleed valve 30 is bled off if required. The hydraulic plate assembly 200 is detached by twisting or rotating from thread 23 on the hydraulic grapple pipe connector assembly 300 shown in FIG. 3. The other parts of the bottom hole assembly can now be attached to the hydraulic grapple pipe connection assembly 300 via the standard thread 23.

Figure 4:
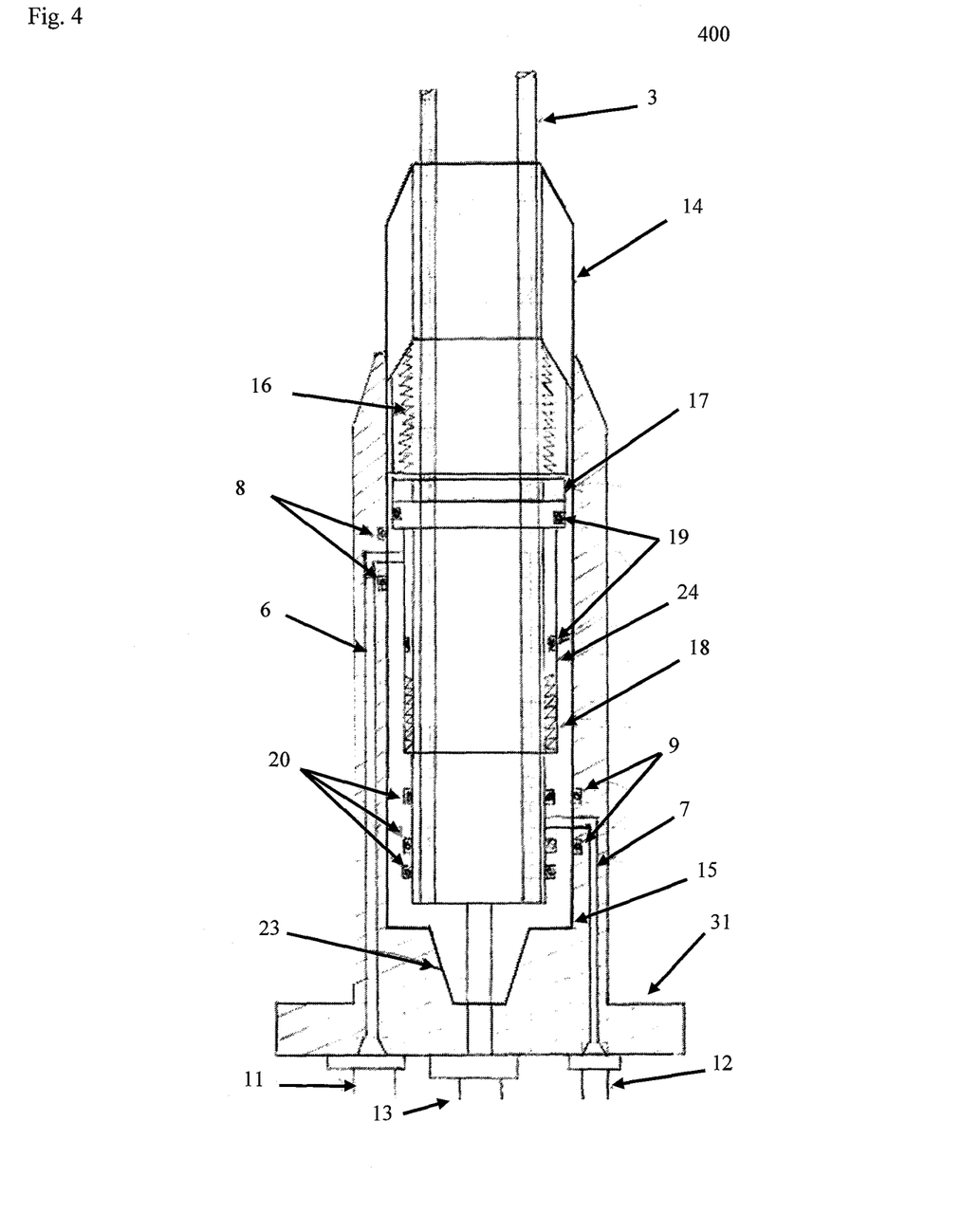
FIG. 4 shows a cross sectional view of the fully assembled hydraulic plate system and hydraulic pipe connector system showing hydraulic ports for setting the grapple connector and ports for externally testing the connector seals.

FIG. 4 shows the entire assembly 400 as it would be assembled and attached to the pipe end. The entire assembly 400 shows the assembled hydraulic grapple pipe connector assembly 300 installed into the hydraulic plate assembly 200 ready to be hydraulically attached onto the pipe 4 using hydraulic connection ports 11, 12 and hydraulic bleed valve port 13. The assembly 400 also shows the hydraulic connection port 11 for setting the grapple 16 within the hydraulic grapple slip connector assembly 300 and the other hydraulic connector port 12 for testing the hydraulic slip connector seals 20 internally to the pipe it is attached too. The third and middle port 13 allows for internal pressure that may be present within the pipe after testing to be released via bleed valve 30.

The system described herein has several novel and unique features. For instance, the hydraulic plate assembly 200 attaches to a hydraulically actuated grapple pipe connection assembly 300, which comprises an angular grapple pipe piston assembly 24 to hold the connection onto the pipe 4. In further yet another preferred embodiment, the hydraulic connection comprises a piston 24 that fulfills the following three operational aspects of the setting and the attachment process: 1. piston pressure for movement, 2. a buttress thread for ratcheting, and 3. a ninety-degree shoulder to push and activate the grapple 16 onto the pipe 4. This unique three in one piston assembly 24 eliminates the need for designing three individual components to perform the same task. Once the hydraulically actuated pipe connection assembly 300 and the hydraulic plate assembly 200 are brought together, pressure is applied via the hydraulic lines 26 and 27 and a hydraulic pump 29 to initiate the setting sequence and affix the hydraulic connection assembly 300 to the pipe 4.

Additionally, to attach the pipe 4, the hydraulically initiated grapple pipe connector assembly 300 is installed onto the hydraulic plate assembly 200. The assembly 200 is then slid onto the bare end of the pipe 4 and the hydraulic pump 29 is actuated to initiate the setting sequence to set the grapple 16 onto the pipe 4. The hydraulic plate assembly 200 provides access to an external seal port 22 shown in FIG. 3 within the hydraulic plate assembly 200 and the hydraulic grapple pipe connector test port assembly 300 to test the connector's pipe seals 20 shown in FIG. 3. This eliminates the need to fill the pipe 4 with fluid to test the pipe seals 20 as is the conventional way to test connection. The presence of this external test external seal port 22 shown in FIG. 3 eliminates the need to vent gallons of test fluid to the environment, thereby making a safer, more efficient and cleaner process than what is typically offered with the conventional grapple connectors. The ability to test the seals using the external test port with the pipe 4 devoid of fluid allows the user to test the pipe seals 20 prior to setting the grapple 16. This function cannot be performed on the conventional grapple connectors before, after or during the grapple setting sequence. The option to perform the grapple 16 setting and/or testing of the pipe seals 20 with multiple combinations offers superior operational flexibility.

Further, the system provides hydraulic grapple pipe connection assembly 300 that has vastly improved design compared to the conventional grapple type connections since it incorporates a zero friction grapple assembly. Sledgehammers and tongs are used to make up and to secure a conventional grapple connection to the pipe, which not only makes the process of connecting a slower process but also exposes individuals to hazards and the potential for a serious injury. The present invention uses a zero friction grapple ring that is larger than the outer diameter of the pipe. This allows the end user to forgo the use of sledgehammers and the assembly can now be slid onto the end of the pipe by hand. The actuation of pressure via the hydraulic pump initiates a piston that pushes and clamps the grapple 16 down on to the pipe 4 diameter. This provides a process that is very repeatable and exceptionally safe to the end user.

A particular aspect of a conventional grapple connectors is the potential for error during the makeup of the connections where the individuals with varying field experience have the ability to make up the grapple to the pipe in a different manner and may cause failure of the connection in the wellbore. The zero friction grapple design and hydraulic actuation eliminates the aforementioned failures. Typically, there are multiple test subs required when attaching a grapple connection to the pipe; a pull plate to test whether the connection is secure on the pipe and a pressure test sub to apply pressure via the inside of the pipe to test the grapple's internal seals. Once tested, the pressure is released through a port in the hydraulic plate assembly 200 before the rest of the equipment can be attached to the end of the grapple connection.

The present invention eliminates the need for multiple test subs and the need to fill the pipe with fluid to test the grapple's internal seals. It also provides a large bleed port 13 in the event the pipe pressure is to be vented and does not require the pipe to have fluid in it to test the grapple's internal seals due to the design of the external seal port provided via the hydraulic pull plate 31 and external seal port 22 and hydraulic connection port 12. The crucial aspect in the design of the system disclosed herein is the ability to perform the setting function of the connection away from the wellhead and any suspended loads unlike the conventional operations which require the personnel to be standing at the wellhead and under the suspended load. The hydraulic extension leads comprising the hydraulic lines that are attached between the hydraulic pump 29 and the end of the hydraulic plate assembly 200 provide setting pressure away from this dangerous environment.

Additionally, the conventional grapple connections offer no telemetry to determine whether a connection has been made correctly to the right setting force. The hydraulic plate 5 provides for a digital pressure transducer to be affixed to the hydraulic plate 5 and send wireless data to an application (APP) on either a cell phone or a tablet that gives the end user the pressure information to ensure that the correct setting pressure was applied to set the grapple connector with the same force every time. The ability to monitor the setting force of the grapple connector eliminates the human error in the setting sequence. One of the major advantages of the hydraulic plate setting mechanism over that of conventional grapple connections includes that there is no requirement to make tight any connection via threads. All parts of the hydraulic plate assembly 200 and the hydraulic grapple pipe connection assembly 300 are made up by hand and removed by hand. This eliminates the need for heavy equipment.

As used herein, the term "make up" or "made up" a connection refers to two individual parts connections, pipe ends or similar tubular ends brought together to make a connection.

As used herein, the term "assembly" refers to a group of parts that combine to form a unit. For instance, the hydraulic plate assembly, hydraulic grapple pipe connector assembly and hydraulic circuit assembly comprise more than one components that are combined together to form the unit.

As used herein, the term "hydraulic plate assembly" refers to the hydraulic assembly that incorporates multiple hydraulic ports to provide hydraulic pressure to activate portions of the hydraulic slip connector.

As used herein, the term "hydraulic plate" refers to a mechanical apparatus that has in itself hydraulic ports and provides direction and paths for hydraulic fluids to travel along to direct the fluid to a given device to cause movement or changes in the apparatus such as longitudinal, rotations or the building of pressure for testing seals and other mechanical body parts.

As used herein, the term "hydraulic grapple pipe connector assembly" refers to the assembly that is used to clamp onto the pipe using a grapple clamping device activated via a pressure port in the body of the tool that initiates a piston to start the setting and clamping sequence.

As used herein, the term "install" refers to how the assembly or part thereof is attached to or connected to a mating part.

As used herein, the term "port" refers to an orifice that permits the access and flow of fluids to various parts of an assembly for pressure testing or mechanical actuation of other parts within an assembly.

As used herein, the term "0 Rings" refers to a circular rubber seal used to seal between two parts to allow for either pressure build up or to prevent pressure entering or leaving a part/s.

As used herein, the term "grapple" refers to a device, typically circular in shape that has multiple circular grooves that are designed to clamp onto another part to prevent the other part from moving. The grapple can have a grove down the side to allow it to spring open or closed or can be of a segmented design with two to six segments for gripping. The hydraulic grapple pipe connector assembly may comprise one or more grapples.

As used herein, the term "hydraulic line" refers to a stiff or flexible hose that is used to carry fluid from one device, such as a pump, to another device such as a piston to create pressure to activate a mechanism or to test a part for pressure integrity.

As used herein, the term "seal" refers to a rubber or metal seal used to isolate parts from an intrusive environment.

As used herein, the term "quick connection" refers to a device that uses mechanical or hydraulic parts in place of a helical thread to quickly mate multiple parts together.

As used herein, the term "snap tight connection" refers to a connection that is typically spring loaded to allow a hose to snap together securely other parts such as hydraulic hoses.

As used herein, the term "grapple set line" refers to the port and hydraulic port that is used to initiate and set the grapple to clamp onto the pipe.

As used herein, the term "test set line" refers to the port and hydraulic hose that is used to test the seals in the hydraulic slip connection to test the seals around the pipe end.

As used herein, the phrase "bled off" refers to venting fluid, gas or pressure from within a body by opening the valve.

As used herein, the term "pipe bleed valve" refers to a device that when opened allows pressure from within a body to be relieved of its pressure through the open bleed valve.

As used herein, the term "lower hydraulic housing" refers to a sub assembly that permits pressure to be applied to it to enable internal parts within the housing to move in multiple directions. As used herein, the term "hydraulic circuit assembly" refers to hydraulic lines, ports and valves arranged in such a way as to perform multiple tasks including but not limited to pressure testing, seal testing and mechanical actuation of parts.

As used herein, the term "buttress thread" refers to refers to an angular thread that when forced in a direction cannot return to its previous position.

As used herein, the term "external seal port" refers to a hole or channel machined into the body of the tool to allow passage of fluids of gases to manipulate or test a device with pressure.

As used herein, the term "piston assembly" refers to the mechanism that moves with the application of pressure to manipulate a device. The term "assembly" means there are multiple parts in the piston assembly. For example, the assembly includes the piston, O rings and buttress thread.

As used herein, the term "top sub" refers to the upper most part of the assembly that is used to hold the entire assembly together and also acts to push the slips onto the pipe via the top sub internal angled shoulder.

As used herein, the term "friction ring" refers to a ring of dissimilar material than what it is connected to. This friction ring allows parts to be removed without galling as it provides a mechanical low friction contact when sandwiched between two parts of a different material than the ring itself.

As used herein, the term "thread" refers to a helical single or multi start groove that allows two or more parts to be screwed together.

As used herein, the term "hand pump" refers to a reservoir of fluid that is attached to a pump that can provide pressure to an assembly for testing or actuation of parts.

As used herein, the term "two-way valve" refers to a device that can direct fluid in multiple by turning a directional knob left or right.

As used herein, the term "mating pipe end" refers to the end of a joint of pipe or a reel of pipe or any bare pipe or threaded pipe end of various sizes and materials that can be attached together via the pipe ends.

As used herein, the term "No-Go" refers to a point at which a mating part within an assembly cannot pass due to for instance, a smaller shoulder than the part that is trying to pass it. It will 'No-Go'.

The foregoing descriptions of the embodiments of the present invention have been presented for purposes of illustration and description. They are not intended to be exhaustive or to limit the present invention to the precise forms disclosed. The exemplary embodiments were chosen and described in order to best explain the principles of the present invention and its practical application, to thereby enable others skilled in the art to best utilize the present invention.

What is claimed is:

1. A hydraulic plate and pipe connection system, comprising:
   a pipe;
   a hydraulic plate assembly comprising:
   a hydraulic plate;
   one to a plurality of hydraulic connection ports, wherein said hydraulic connection ports allow passage of hydraulic fluid or pressure to said hydraulic plate assembly;
   one to a plurality of O' Rings;

a means to install a hydraulic grapple pipe connector assembly into said hydraulic plate assembly;

at least two hydraulic connection ports, wherein at least one said hydraulic connection port communicates with a hydraulic line to initiate a grapple setting and wherein at least one hydraulic connection port attaches to a hydraulic line to test one to a plurality of seals on said hydraulic grapple pipe connector assembly;

at least one bleed valve port connected to a bleed valve to vent internal fluid pressure;

said hydraulic grapple pipe connector assembly comprising:

a top sub;

a lower hydraulic housing connected to the top sub for reversibly attaching and sealing around the end of a pipe thus permitting pressure testing of pipe seals;

one to a plurality of grapples to hold the pipe;

a friction ring with a diameter that is larger than the diameter of said pipe;

a buttress thread;

one to a plurality of pairs of piston O'rings;

one to a plurality of pipe seals on one side or each side of the hydraulic grapple pipe connector;

a hydraulic setting port;

an external seal port;

a thread to enable attachment of the hydraulic grapple pipe connection assembly to the hydraulic plate assembly;

a piston assembly;

a hydraulic circuit assembly allowing the setting sequence to commence comprising:

a hydraulic pump;

a two-way valve;

two hydraulic connection lines for communication with said hydraulic connection ports;

a pipe bleed valve; and a hydraulic quick connection, snap tight connection or both to facilitate connection of hydraulic lines between said hydraulic connection ports, said two-way valve and said hydraulic port.

2. The hydraulic plate and pipe connection system of claim 1, further comprising:

at least two wireless pressure transducers affixed to either the hydraulic circuit assembly or hydraulic connection ports to collect and transmit wireless data to an electronic device that monitors, records or both, all pressure setting sequences and tests.

3. The hydraulic plate and pipe connection system of claim 1, wherein said hydraulic plate and pipe connection system sets a pipe connection to said pipe via said hydraulic grapple pipe connector assembly, externally tests internal seals on said pipe connection in the presence or absence of fluid within said pipe, activates said hydraulic grapple pipe connector assembly onto said pipe end without the need for threads to connect said pipe to said hydraulic grapple pipe connector assembly, provides testing of the grapple grip force by pulling against the hydraulic plate assembly via a pull plate step, provides ports between said hydraulic plate assembly and said hydraulic grapple pipe connector assembly so that pressure can be applied via the hydraulic plate assembly to set said hydraulic grapple pipe connector assembly onto said pipe, to remove said hydraulic plate assembly or both, supports a pull test on the hydraulic grapple pipe connector assembly to determine sufficient anchor force with or without the need to remove applied pressure, provides constant force during pull test to maintain and energize the piston and move said grapple upwards and clamp onto said pipe.

4. The hydraulic plate and pipe connection system of claim 1, wherein said hydraulic plate and pipe connection system performs multiple functions in one single application, said multiple functions comprising:

reversibly attaching said grapple to said pipe firmly, allowing external testing of pipe seals, performing a pull test on said hydraulic grapple pipe connector assembly, allowing internal pressure testing of said pipe, performing bleed of fluid or internal pressure of pipe, providing wireless telemetry for pressure test sequences, and activating a setting piston and buttress thread by said hydraulic circuit assembly to move upward to set said grapple and prevent release once hydraulic pressure is removed.

5. The hydraulic plate and pipe connection system of claim 1, wherein said hydraulic grapple pipe connector assembly attaches to said pipe using hydraulic pressure and not threads.

6. The hydraulic plate and pipe connection system of claim 1, wherein said piston assembly in the hydraulic grapple pipe connector assembly comprises: a piston, O rings, and a buttress thread.

7. The hydraulic plate and pipe connection system of claim 1, wherein at least one of the ports in said hydraulic grapple pipe connector assembly allows testing of internal pipe seals.

8. The hydraulic plate and pipe connection system of claim 1, wherein said hydraulic grapple pipe connector assembly can be seal tested internally or externally.

9. The hydraulic plate and pipe connection system of claim 1, wherein said grapple in said hydraulic grapple pipe connector assembly enables said hydraulic grapple pipe connector assembly to attach to said pipe exhibiting an oversized diameter.

10. The hydraulic plate and pipe connection system of claim 1, wherein diameter of said grapple is reduced by hydraulic pressure where said top sub allows the grapple to be forced into said lower hydraulic housing so that said hydraulic grapple pipe connector assembly fits firmly onto said pipe.

11. The hydraulic plate and pipe connection system of claim 1, wherein said hydraulic circuit assembly sets a hydraulic grapple pipe connector assembly onto said pipe using hydraulic pressure, tests internal seals, provides pressure via said hydraulic plate assembly to apply sufficient setting force to set a grapple ring onto said pipe with sufficient force to indent said pipe with said grapple, or both.

12. The hydraulic plate and pipe connection system of claim 1, wherein said hydraulic circuit assembly comprises a multi-position valve capable of diverting hydraulic fluid to initiate setting of said hydraulic grapple pipe connector assembly to said pipe via a hydraulic manifold and allows testing of the seals to assure said hydraulic grapple pipe connection is attached securely to said pipe.

13. The hydraulic plate and pipe connection system of claim 1, wherein said lower hydraulic body housing provides a plurality of hydraulic ports in the same body to allow grapple setting and seal testing on the hydraulic grapple pipe connector assembly.

14. A method of making connection to a pipe hydraulically, comprising:

assembling the components of the hydraulic plate and pipe connection system of the system of claim 1;

installing an assembled hydraulic grapple pipe connector assembly into said hydraulic plate assembly of the system of claim 1 to form a fully assembled hydraulic plate assembly and hydraulic grapple pipe connector assembly;

attaching said hydraulic circuit assembly of the system of claim 1 to the fully assembled hydraulic plate assembly and hydraulic grapple pipe connector assembly; and connecting said hydraulic circuit assembly attached to the fully assembled hydraulic plate assembly and hydraulic grapple pipe connector assembly to the end of the pipe to the point of "no-go";

releasing hydraulic fluid into said fully assembled hydraulic plate assembly and hydraulic grapple pipe connector assembly via a hydraulic pump;

firmly gripping said pipe via directed hydraulic fluid to said grapple between a set of o-rings to activate a piston assembly in the hydraulic grapple pipe connector assembly;

bleeding pressure off back the hydraulic pump; and reversibly securing said hydraulic pipe connector assembly to said pipe.

15. The method of claim 14, further comprising:

pressure testing pipe seals of said hydraulic grapple pipe assembly by turning a two-way valve to direct hydraulic fluid to the hydraulic line, wherein said hydraulic line directs pressure through one of the ports on the hydraulic plate assembly, directs flow between O' rings on the hydraulic plate assembly, and directs hydraulic pressure between said seals to be pressure tested.

16. The method of claim 14, wherein the assembling of the components of the hydraulic grapple pipe connector assembly comprises:

connecting the top sub, a lower hydraulic housing, a grapple, a friction ring, a buttress head, Piston O rings, pipe seal(s), a hydraulic setting port, an external seal port and a buttress thread.

17. The method of claim 14, wherein installing the assembled hydraulic grapple pipe connector assembly onto said hydraulic plate assembly comprises:

inserting the hydraulic grapple pipe connector assembly into the means for installing the hydraulic grapple pipe connector assembly into the hydraulic plate assembly; and turning the thread on the hydraulic grapple pipe connector assembly with a twisting or rotating motion into said hydraulic plate assembly until the thread stops twisting or rotating to a point of no-go.

18. The method of claim 14, wherein said fully assembled hydraulic plate assembly and hydraulic grapple pipe connector assembly comprises:

one to a plurality of O' rings on the hydraulic plate assembly aligned with the external seal port of the hydraulic grapple pipe connector assembly and another one to a plurality of O' rings aligned with the grapple of the hydraulic grapple pipe connector assembly, wherein said alignment allows hydraulic fluid to be directed between said O' rings.

19. The method of claim 14, wherein attaching said hydraulic circuit assembly of the system to the fully assembled hydraulic plate assembly and hydraulic grapple pipe connector assembly, comprises:

connecting one end of hydraulic lines to ports on the hydraulic plate assembly; and connecting the other end of the hydraulic lines to the quick connectors on the hydraulic grapple pipe connectors, wherein the quick connectors are connected to the hydraulic pump via a two-way valve.

20. The method of claim 14, wherein connecting said hydraulic circuit assembly to the fully assembled hydraulic plate assembly and hydraulic grapple pipe connector assembly to the end of the pipe, comprises:

sliding the entire assembly comprising said fully assembled hydraulic plate assembly and hydraulic grapple pipe connector assembly connected to the hydraulic circuit assembly onto the end of a pipe until the entire assembly cannot move further and will "No-Go" inside a lower piston housing on the hydraulic grapple pipe connector assembly;

actuating said hydraulic pump to supply hydraulic fluid through one of said ports on said hydraulic plate assembly that is connected to one of the hydraulic lines, thereby directing hydraulic fluid between the O rings to an external test port to test pipe seals with said hydraulic grapple pipe connector assembly, with or without fluid within said pipe, prior to setting the grapple;

pressing the hydraulic pump to apply hydraulic pressure through one of the ports on said hydraulic plate assembly that is connected to one of the hydraulic lines, thereby directing hydraulic fluid between the O rings to activate the piston assembly in the hydraulic grapple pipe connector assembly to move forward and forcing said grapple to clamp onto the end of the pipe;

bleeding off the pressure back to the hydraulic pump; and testing for a secure connection via a hydraulic pull plate test and/or via internal sensors and wireless telemetry.

* * * * *

UNITED STATES PATENT AND TRADEMARK OFFICE
CERTIFICATE OF CORRECTION

PATENT NO. : 10,408,702 B2
APPLICATION NO. : 15/402571
DATED : September 10, 2019
INVENTOR(S) : Stuart McLaughlin Page 1 of 1

It is certified that error appears in the above-identified patent and that said Letters Patent is hereby corrected as shown below:

In the Specification

Column 7, Line 52 - Change "of this external test external seal port" to "of this external seal port"

Column 9, Line 30 - Change "As used herein, the term 0 Rings" to "As used herein, the term O Rings"

In the Claims

Column 13, Line 8 - Change "and hydraulic grapple pipe connector assembly; and" to "and hydraulic grapple pipe connector assembly;"

Signed and Sealed this
Thirty-first Day of March, 2020

Andrei Iancu
*Director of the United States Patent and Trademark Office*